G. LAKHOVSKY.
INSTRUMENT FOR MEASURING OR VERIFYING THE SUPERELEVATION, GAGE, AND INCLINATION OF THE RAILS OF RAILWAY TRACKS.
APPLICATION FILED MAR. 25, 1913.
1,136,427.
Patented Apr. 20, 1915.
4 SHEETS—SHEET 1.
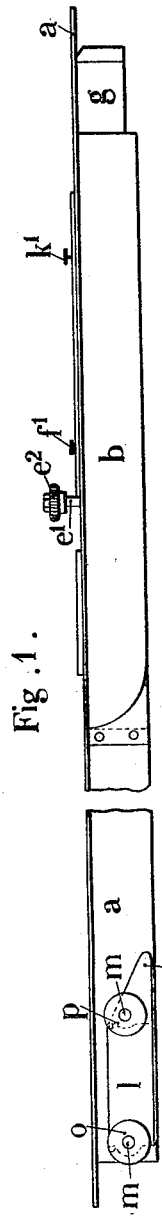
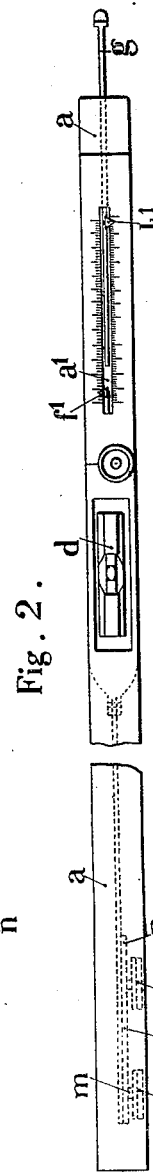
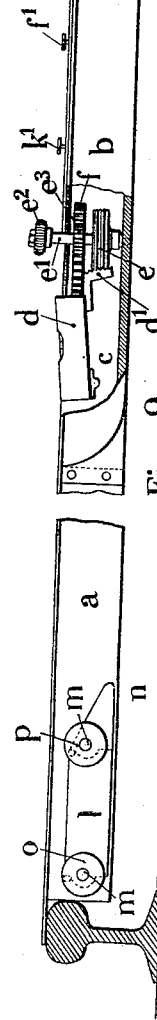
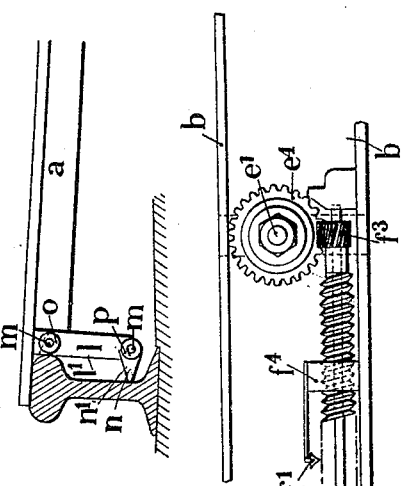
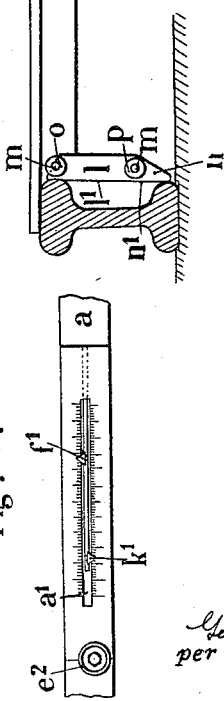
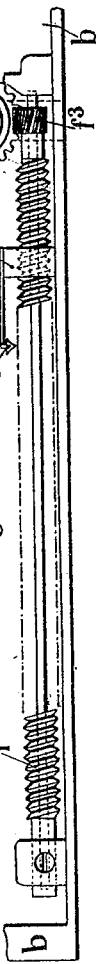
Inventor
Georges Lakhovsky
per A. W. Glass
Attorney.

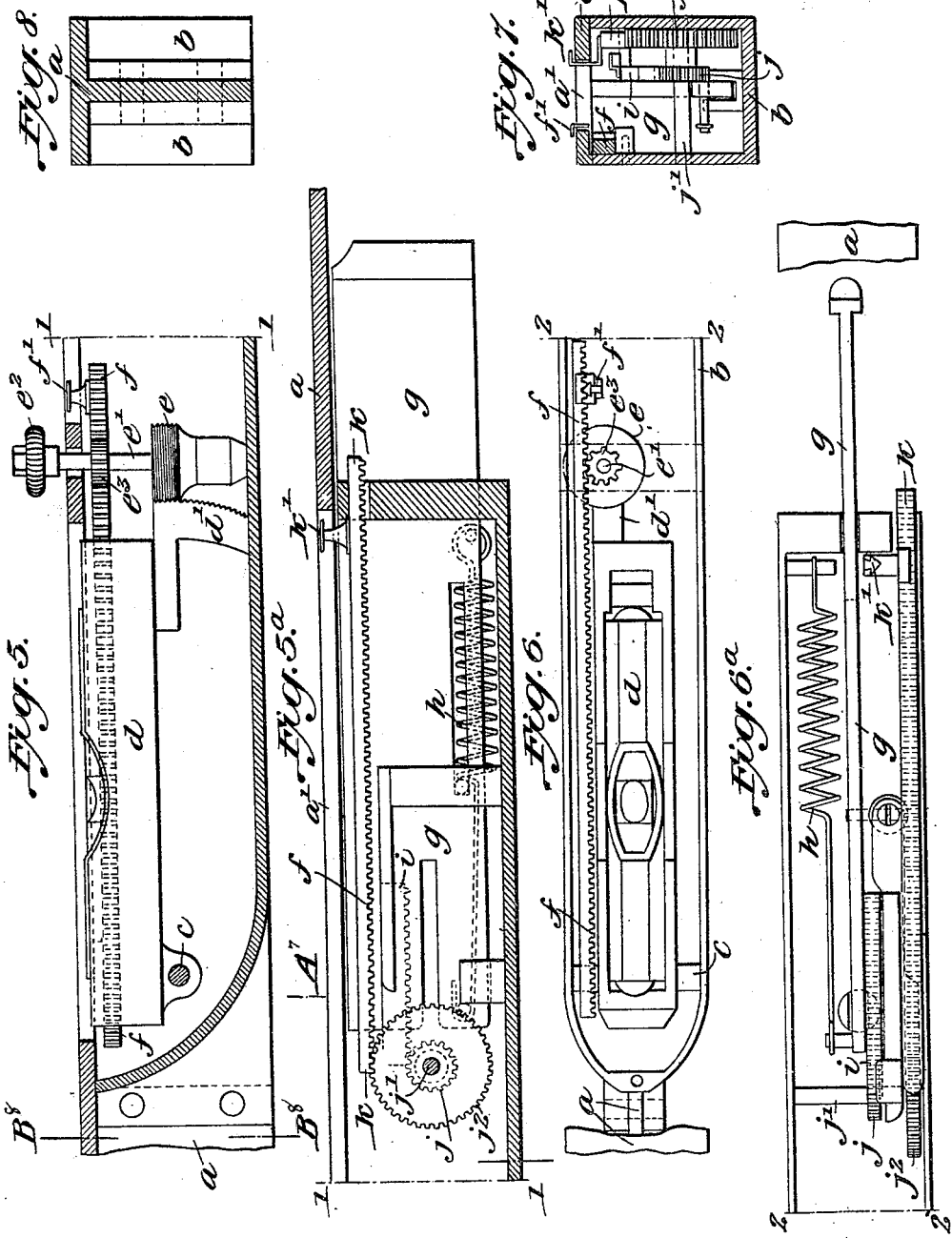

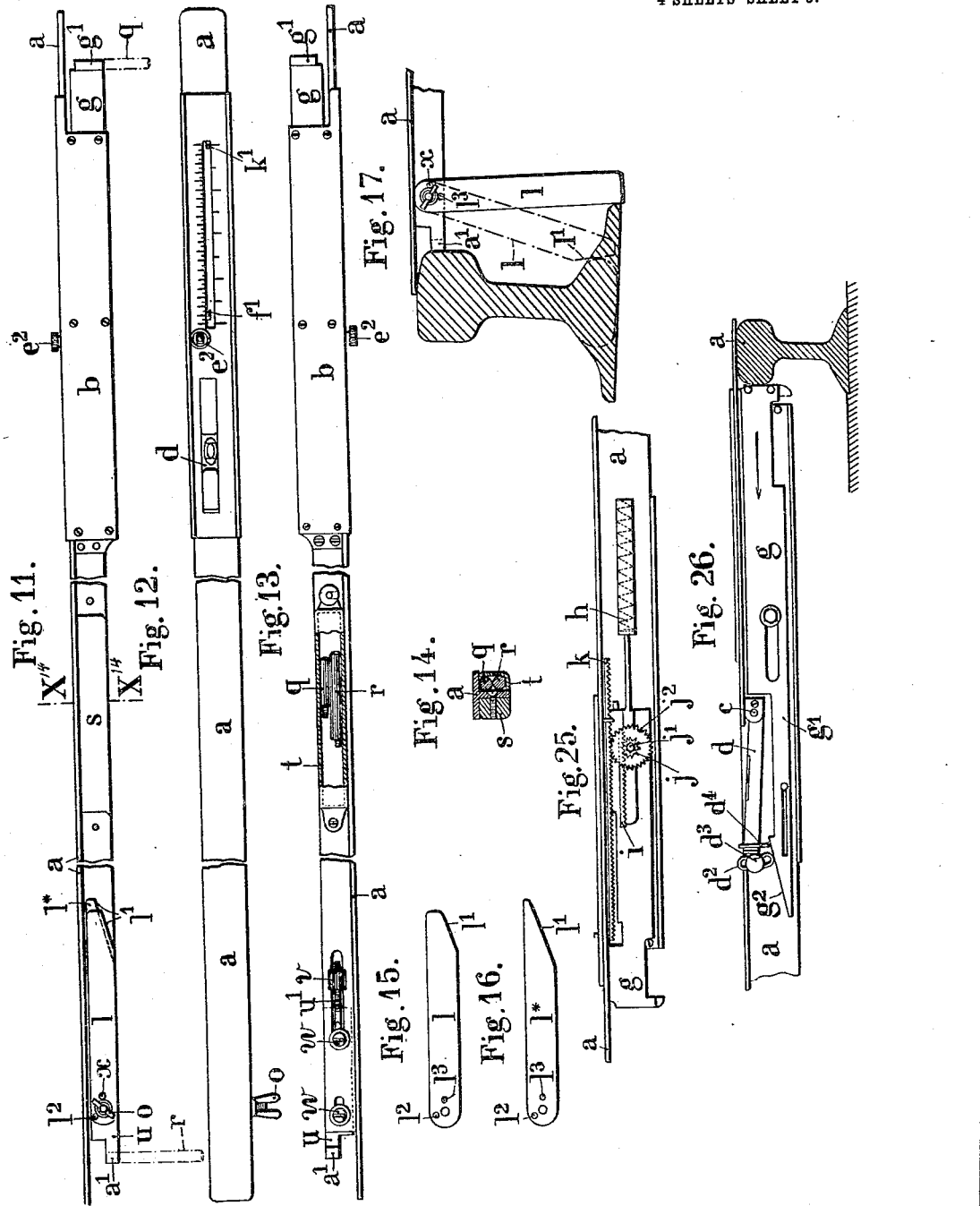

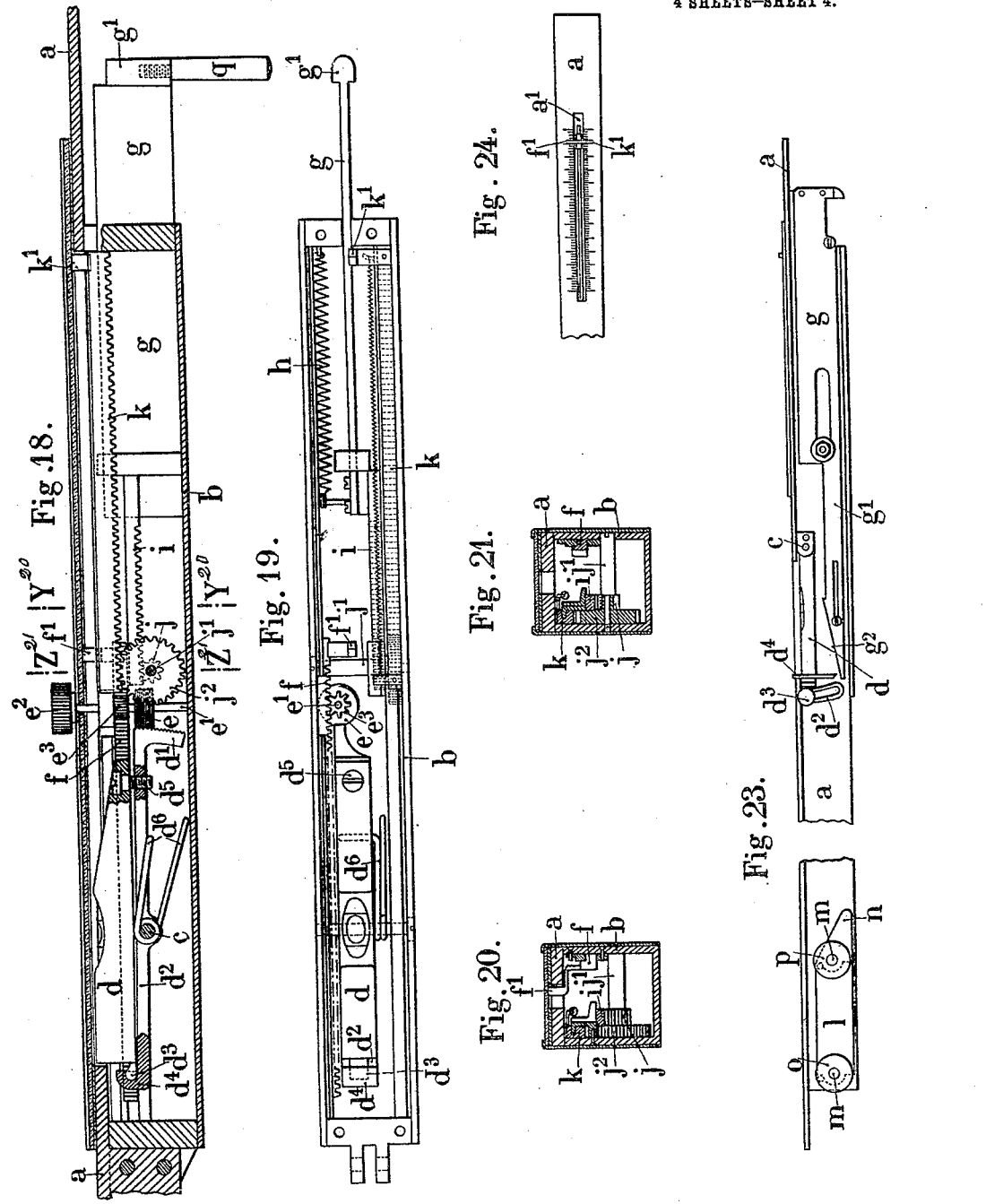
G. LAKHOVSKY.
INSTRUMENT FOR MEASURING OR VERIFYING THE SUPERELEVATION, GAGE, AND INCLINATION OF THE RAILS OF RAILWAY TRACKS.
APPLICATION FILED MAR. 25, 1913.
1,136,427.
Patented Apr. 20, 1915.
4 SHEETS—SHEET 4.

UNITED STATES PATENT OFFICE.

GEORGES LAKHOVSKY, OF PARIS, FRANCE.

INSTRUMENT FOR MEASURING OR VERIFYING THE SUPERELEVATION, GAGE, AND INCLINATION OF THE RAILS OF RAILWAY-TRACKS.

1,136,427.

Specification of Letters Patent.

Patented Apr. 20, 1915.

Application filed March 25, 1913. Serial No. 756,793.

*To all whom it may concern:*

Be it known that I, GEORGES LAKHOVSKY, of 5 Avenue du Bois de Boulogne, in the city of Paris, Republic of France, have invented an Instrument for Measuring or Verifying the Superelevation, Gage, and Inclination of the Rails of Railway-Tracks, of which the following is a full, clear, and exact description.

The present invention has for its object an instrument permitting of measuring in a simple, rapid and precise manner the superelevation of a railway track, the gage and the inclination of the rails.

This instrument, the length of which corresponds substantially to the normal gage of railway tracks, carries at a certain position in its length a water level arranged in the longitudinal direction of the instrument and pivoted on a transverse axis; this level is provided with an operating device which permits of turning it about the said transverse axis and to bring it to the horizontal position when the instrument is placed across the track on a curve and rests with both ends on the rails thereof thus occupying an inclined position, the said operating device actuates simultaneously a movable pointer on a graduated scale, the divisions of which indicate the superelevation of one rail relatively to the other; the different positions of this pointer on the graduated scale corresponding to the different angles which the level forms with the instrument. The present instrument is, moreover, provided at one of its ends, with a spring controlled movable heel portion actuating by means of a device which amplifies the movement, a pointer sliding on a graduated scale, the divisions of which indicate the gage of the track. At its other end, this instrument is provided with a pivoted false square having a movable member which in its lowered position forms with the instrument an angle equal to the inclination which the rail should have.

The accompanying drawing illustrates, by way of example, an embodiment of the invention.

Figure 1 is an elevation of the instrument. Fig. 2 is a corresponding plan. Fig. 3 shows the instrument partly in elevation, partly in section, resting on the two rails of a track. Fig. 4 is a corresponding partial plan. Fig. 5 is a longitudinal section, on an enlarged scale, of a structure for carrying the controlling mechanism of the water level. Fig. 5$^a$ is a like section of the part that carries the controlling mechanism of the pointers indicating the measures. Fig. 6 is a corresponding plan of Fig. 5, the top plate of the instrument being removed. Fig. 6$^a$ is a like plan of Fig. 5$^a$. Figs. 7 and 8 are two transverse sections on lines $A^7$—$A^7$ and $B^8$—$B^8$, respectively, of Fig. 5. Figs. 9 and 10 show how to use the false square on a double headed rail and on a flat bottom rail, respectively. Figs. 11 to 21 show another method of carrying out the instrument; Fig. 11 is a longitudinal elevation showing one of the sides of the instrument; Fig. 12 is a plan view; Fig. 13 is a longitudinal elevation of the instrument inverted, showing the other side of the latter; Fig. 14 is a cross section made according to line $X^{14}$—$X^{14}$ of Fig. 11; Figs. 15 and 16 are two detail views showing two false squares corresponding to two different types of rails; Fig. 17 is a detail view showing the false square in the position it must occupy for the verification of the inclination of a rail; Figs. 18 and 19 are two detail views, at a greater scale, showing in longitudinal section and plan view, the top of the instrument being removed, the controlling mechanism of the water level and the pointers indicating the measures; Figs. 20 and 21 are two cross sections made respectively according to lines $Y^{20}$—$Y^{20}$ and $Z^{21}$—$Z^{21}$ of Fig. 18. Fig. 22 shows a modification according to which the pointer indicating the superelevations, is controlled by an endless screw. Figs. 23 to 26 show another modification of the device measuring the superelevations; Fig. 23 shows, in elevation one of the faces of the instrument; Fig. 24 is the plan of a portion of the instrument; Fig. 25 shows, in elevation, a portion of the other face, and Fig. 26 shows the instrument in position for measuring the superelevation.

As Figs. 1 to 8 show, the present instrument comprises a ruler $a$ formed, for example, by a T-shaped iron bar the length of which slightly exceeds that of the normal gage of the track and the length of the web of which is shorter so that when the instrument is placed across the track, it can rest on both rails by the projecting ends of the T-shaped bar, as shown in Fig. 3.

The web of this instrument is provided with a casing $c$ inclosing all the measuring members. This casing $c$ is provided with a transverse member $c$ on which the water level $d$ is pivoted. The water level $d$ instead of being directly supported by the transverse member $c$ may be mounted as illustrated in Figs. 18 and 19 on a lever $d^2$ by means of a device allowing the easy adjustment of said water level when mounting the instrument; the water level $d$ comprises, in this case, a heel portion $d^3$ constituting a rotation axis and fitted in a bearing $d^4$ presented by one of the ends of the lever $d^2$; at its other end the water level $d$ is provided with an adjusting screw $d^5$ allowing to adjust the position of the water level $d$ on the lever $d^2$. At the lower part either of the water level $d$ in the form of the invention illustrated in Fig. 3, or of the lever $d^2$ in the form of the invention illustrated in Fig. 18, is arranged a toothed sector $d^1$ with which meshes worm $e$ keyed on a spindle $e^1$ provided, at its upper part, with a thumb screw $e^2$. By only operating the thumb screw $e^2$ a rotary movement is imparted to the spindle $e^1$ and the worm $e$ and thus an angular movement is given either directly to the water level $d$ about the member $c$ (Figs. 3, 5, 6) or to the lever $d^2$, and consequently to the level $d$ moving with the latter (Fig. 18). The lever $d^2$ is constantly urged by a returning spring $d^6$ which insures a constant contact of the teeth of the sector $d^1$ with the thread of the worm $e$.

The displacements thus communicated to the level $d$ are measured by the following device: A pinion $e^3$ is keyed on the spindle $e^1$ and meshes with a rack $f$ freely movable within the casing $b$; this rack carries a pointer $f^1$ sliding in a slot $a^1$ in Fig. 4 formed, to this end, in the ruler $a$ in front of a graduated scale the divisions of which give the different values of superelevation. At one of its ends the instrument carries a movable heel portion $g$ adapted to slide freely within the casing $b$ and which is pushed outwardly by a spring $h$ Figs. 5ᵃ and 19. The displacements of this movable heel are measured by the following amplifying device: A rack $i$ is fixed on this movable heel portion $g$ Figs. 18 and 25, the said rack meshing with a pinion $j$ keyed on a shaft $j^1$ also carrying a toothed wheel $j^2$ which in turn meshes with another rack $k$. The latter is provided with a pointer $k^1$ which also slides in the slot $a^1$ of the ruler, in front of a graduated scale the divisions of which give the different values of the gage of the track.

In order to allow the measurement of the gage of the track, even in the case it is not possible to place the ruler between these rails, as for instance where the latter are provided with side-rails, the heel portion $g$ and the opposite end of the ruler can be provided, as illustrated in Figs. 11 and 18, with screw threaded sockets $g^1$ $a^1$ adapted to receive pins $q$ $r$ which are screw threaded at one of their ends. The ruler being held in the hand, the pins $q$ $r$ are fitted in the intervals between each rail and its side-rail, taking care to apply the fixed pin $r$ against one of the rails, the pin $q$ carried by the movable heel portion $g$, under the action of the returning spring of the latter, presses against the edge of the other rail, and the pointer $k^1$ which follows the displacements of the movable heel portion $g$ and, consequently, of the pin $q$ carried by the latter, gives the value of the gage of the track. In order to be held more easily, the ruler can be provided at its middle portion with a fitting $s$ constituting a handle (Figs. 11 and 14); on one of the faces of the ruler said fitting can be hollow and closed by a slide, shutter or other closing device, so as to constitute an outfit $t$ adapted to contain the pins $q$ $r$, when the latter are not in use, and other accessories. At its end opposite to its movable heel portion the ruler may comprise, as illustrated in Fig. 13, an adjustable heel portion $u$ capable of being operated by a milled nut $v$ located in a recess provided in the web of the ruler. Through said nut passes a screw threaded rod $u^1$ supported by the adjustable heel portion $u$. Clamping screws $w$ allow to secure said heel portion in the position where it has been brought. By means of this device it is possible to rectify very easily the length of the ruler, either at the time of its manufacture or after a tolerably long period of service, so that the indications given by the index $k^1$ should be always rigorously exact. On its other end the ruler $a$ carries a false square intended for the purpose of verifying the inclination of the rails. This false square is formed (Figs. 1, 2, 3, 9 and 10) by an arm $l$ movable about an axis $m$ and is stopped when it is developed (Figs. 9 and 10) in such a manner that its inner edge $l^1$ forms with the top of the ruler an angle equal to the inclination which the rail should have.

Normally, the arm $l$ is turned up to the web (as shown in Figs. 1, 2 and 3). The arm $l$ is provided, at its lower end, with another pivoted arm $n$ the edge $n^1$ of which forms an extension to the edge $l^1$ in the case when verifying the inclination of a double headed rail (Fig. 9); on the other hand, when verifying the inclination of a flat bottom rail, the arm $n$ is inclined relatively to the arm $l$ (Fig. 10) in such a manner that its end rests on the web of the rail, as will be seen hereafter. Fixing nuts $o$, $p$ permit of returning arms $l$, $n$ in their respective positions. The position of the false square on the ruler can also be determined on the ruler by the engagement of a stud $x$, presented by the web of the ruler, into holes $l^2$, $l^3$, suitably provided in the branch $l$ (Figs. 11, 15, 16) and corresponding to two positions of work and rest which the branch $l$ is capable of occupying on the ruler. The ruler can be provided with two or more branches $l\ l$ (Figs. 11, 15, 16) presenting variable inclinations and corresponding to the different types of rails. The branch $l$, constituting a false square, may also present several holes provided in such a manner as to allow said branch to occupy different inclinations corresponding to the various types of rails according to the hole into which is fitted the stud $x$ on the ruler.

The instrument is used in the following manner: The instrument is placed across the track in such a manner that it rests thereon with the ends of its top plate. In this position, the movable, spring controlled heel portion $g$ is pressed against the rail as shown in Fig. 3. The instrument is adjusted in such a manner that if the gage of the track is normal, the pointer $k^1$ is in front of the division corresponding to the normal gage; on the contrary if the gage of the track exceeds or is less than this length then the pointer $k^1$ which follows the displacements of the movable heel portion $g$, comes in front of a division indicating the gage with a very great exactitude owing to the amplification of the movement. In the case of measuring the superelevation, the latter is effected by a simple operation of the thumb screw $e^2$, which is turned until the water level $d$ occupies a horizontal position; the pointer $f^1$ displaced by the rack $f$ and the pinion $e^3$ with an amplification of movement, comes in front of a division of the graduated scale and indicates the value of the superelevation in a very precise manner owing to a multiplication of movement transmitted to this pointer relatively to the angular displacement given to the level so as to bring it in the horizontal position.

The verification of the inclination of the rails, which is usually 1 in 20, is effected in the following manner: In the case of double headed rails, the arm $l$ is lowered right down, care being taken that the edge $n^1$ of the arm $n$ is in line with the edge $l^1$ of the arm $l$, as shown in Fig. 9, and these arms are retained in that position by nuts $o\ p$. According to the construction, the edges $l^1$, $n^1$ form in this position, with the ruler plate an angle which is equal to the inclination which the rail should have; it suffices to verify, by applying the edges $l^1$, $n^1$ of the false square against the edge of one of the heads of the rails, that this edge $l^1\ n^1$ should be exactly tangential to the other head. In the case of flat bottom rails, the procedure is slightly different. First of all the false square is adjusted on a standard rail the inclination of which is correct, to this end, the arm $l$, fully extended as in the precedent case, is applied against the head of the rail, then the lower arm $n$ is turned up so as to bring its point on the web of the rail (Fig. 10), the two arms being retained in these positions by screwing home the two nuts $o$, $p$. To verify the inclination of a rail, the false square is applied thereagainst as shown in Fig. 10 and if the inclination of the rail is correct then the edge $l^1$ and the pointed end of the arm $n$ must be in contact with the head and the web of the rail, respectively.

The construction just described is only given by way of example as other devices can be used either for the control or for the transmission of movements to be imparted to the members of the present instrument.

Fig. 22 shows a modification in which the pointer $f^1$ which indicates the superelevation, is controlled by an endless screw $f^2$ the spindle $e^1$ carries in this case a pinion $e^4$ with helical teeth which mesh with another helically toothed pinion $f^3$ integral with the endless screw $f^2$, the latter transmits, in rotating, a translatory movement to a nut $f^4$ which carries the pointer $f^1$.

In the modification shown in Figs. 23 to 26, the water level $d$, which is movable by hand, is provided, at its end opposite to the axis of rotation $c$ with a curved slot $d^2$ traversed by a fixed threaded rod, carried by the web of the instrument and on which a tightening nut $d^3$ is screwed, permitting of retaining the level $d$ in a determined position. The level $d$ is provided moreover, with a tappet $d^4$ capable of turning around this level as it will be seen hereafter. The movable heel portion $g$ has an extension $g^1$ terminating in an inclined plane $g^2$. The height of the tappet $d^4$ and the position of the inclined plane $g^2$ of this instrument are adjusted in such a manner that the tappet $d^4$ is in contact with the base of the inclined plane $g^2$ when the level $d$ is parallel to the top table of the instrument (Fig. 12).

To measure a superelevation the instrument is placed across the track as stated previously, then the level $d$ is displaced, by hand, about its axis $c$ so as to bring it in the horizontal position and is thus retained by means of the securing nut $d^3$; then the movable heel portion $g$ is pushed by hand, in the direction indicated by the arrow shown in Fig. 26, until the inclined plane $g^2$ meets the tappet $d^4$, the displacement thus communicated to the movable heel portion $g$ is a function of the angle which the level makes with the ruler and consequently is a function of the superelevation. The displacements of this movable heel portion $g$ are indicated by a device similar to that described above, the heel portion $g$ is provided with a rack $i$ which transmits its motion, by means of two multiplying gears $j^1$, $j^2$ (Fig. 25) to another rack $k$; the latter carries two pointers $k^1$ and $f^1$ (Figs. 24 and 25) which slide in front of the divisions of two graduated scales, one corresponding to the gage of the track and the other to the superelevation.

In case the instrument is used for measuring the gage of the track only then the tappet $d^4$ is lifted so as to not hinder the free movement of the movable heel portion $g$.

The present instrument may be made of any material and its constructional details modified.

Claims:

1. A measuring instrument permitting of measuring the superelevation of a rail and the gage of a railway track and also of verifying the inclination of the rails, comprising a level arranged in the longitudinal direction of the instrument and movable about a transverse axis therein; a toothed sector moving with said level; a pointer movable in front of a graduated scale arranged on the upper face and in the longitudinal direction of the instrument; a rack upon which said pointer is mounted and movable in the longitudinal direction of the instrument; a vertical operating rod projecting above the instrument, carrying an operating knob and on which are rigidly mounted a worm gearing with the toothed sector of the level and a pinion gearing with the rack of the pointer.

2. A measuring instrument permitting of measuring the superelevation of a rail and the gage of a railway track and also of verifying the inclination of the rails, comprising a level arranged in the longitudinal direction of the instrument; a lever movable about a transverse axis in said instrument and on which the lever can pivot and be secured by means of an adjusting screw; a toothed sector mounted on said lever; a pointer movable in front of a graduated scale arranged on the upper face and in the longitudinal direction of the instrument; a rack upon which said pointer is mounted and movable in the longitudinal direction of the instrument; a vertical operating rod projecting above the instrument, carrying an operating knob and on which are rigidly mounted a worm gearing with the toothed sector of the level and a pinion gearing with the rack of the pointer.

3. A measuring instrument permitting of measuring the superelevation of a rail and the gage of a railway track and also of verifying the inclination of the rails, comprising a level arranged in the longitudinal direction of the instrument and movable about a transverse axis in said instrument; a toothed sector moving with said level; a pointer movable in front of a graduated scale arranged on the upper face and in the longitudinal direction of the instrument; a rack upon which said pointer is mounted and movable in the longitudinal direction of the instrument; a vertical operating rod projecting above the instrument, carrying an operating knob and on which are rigidly mounted a worm gearing with the toothed sector of the level and a pinion gearing with the rack of the pointer; a movable heel portion arranged at one of the ends of the instrument and urged toward the exterior by a returning spring; another pointer movable in front of a second graduated scale arranged on the upper face of the instrument opposite the previous scale; a rack on which said pointer is mounted and movable in the longitudinal direction of the instrument, and means for transmitting with amplification the displacements of the movable heel portion to said rack.

4. A measuring instrument permitting of measuring the superelevation of a rail and the gage of a railway track and also of verifying the inclination of the rails, comprising a level arranged in the longitudinal direction of the instrument and movable about a transverse axis in said instrument; a toothed sector moving with said level; a pointer movable in front of a graduated scale arranged on the upper face and in the longitudinal direction of the instrument; a rack upon which said pointer is mounted and movable in the longitudinal direction of the instrument; a vertical operating rod projecting above the instrument, carrying an operating knob and on which are rigidly mounted a worm gearing with the toothed sector of the level and a pinion gearing with the rack of the pointer; a movable heel portion arranged at one of the ends of the instrument and urged toward the exterior by a returning spring; another pointer movable in front of a second graduated scale arranged on the upper face of the instrument opposite the previous scale; a rack on which said pointer is mounted and movable in the longitudinal direction of the instrument; means for transmitting with amplification the displacements of the movable heel portion to said rack; a casing within which are mounted the level, the movable heel portion and the various members of the device giving the measures of the displacements imparted to this level and movable heel portion, said casing being secured under the table of the instrument, the web of the T-shaped bar constituting the instrument being discontinued so as to permit of the mounting of said casing under the instrument; a slit provided in the upper part of the table, in which the two pointers slide and on the longitudinal edges of which are arranged the two graduated scales giving respectively the different values of superelevation and the different values of the gage of the track.

5. A measuring instrument permitting of measuring the superelevation of a rail and the gage of a railway track and also of verifying the inclination of the rails, comprising a level arranged in the longitudinal direction of the instrument and movable about a transverse axis in said instrument; means for displacing said level about said axis; means for indicating and measuring the angular displacements imparted to said level; a movable heel portion formed with a socket arranged at one of the ends of the instrument and urged by a returning spring; means for indicating and measuring the linear displacements of said movable heel portion; a fixed part formed at the opposite end of the instrument also formed with a socket and removable pins adapted to be fitted in the sockets in said fixed and movable portions so as to constitute projections.

6. A measuring instrument permitting of measuring the superelevation of a rail and the gage of railway track and also of verifying the inclination of the rails, comprising a level arranged in the longitudinal direction of the instrument and movable about a transverse axis, in said instrument—means for displacing said level about said axis,—means for indicating and measuring the angular displacements imparted to said level,—a movable heel portion arranged at one of the ends of the instrument and urged by a returning spring,—means for indicating and measuring the linear displacements of said movable heel portion,—a fixed part formed at the opposite end also formed with sockets and removable pins adapted to be fitted in said sockets so as to constitute projections.

7. A measuring instrument permitting of measuring the superelevation of a rail and the gage of a railway track and also of verifying the inclination of the rails, comprising a level arranged in the longitudinal direction of the instrument and movable about a transverse axis in said instrument,—means for displacing said level about said axis,—a movable pointer,—means for imparting to said pointer displacements proportional to those communicated to the level,—a movable heel portion, arranged at one of the ends of the instrument and urged outwardly by a returning spring,—another movable pointer,—means for imparting to this second pointer amplified displacements proportional to those of the movable heel portion,—a casing within which are mounted the level, the movable heel portion and the various members of the device giving the measures of the displacements imparted to this level and movable heel portion a table for the instrument provided with a web said casing being secured under the said table of the instrument, the web of the latter being discontinued so as to permit of the mounting of said casing under the instrument,—a wide slot provided in the upper part of the table and in which the two pointers slide,—a double graduation arranged on the longitudinal edges of said slot, one of these graduations giving the different values of the superelevation and the other graduation giving the different values of the gage of the track, and a fitting arranged in the middle portion of the instrument and adapted to form a handle and an outfit intended to contain pins, when they are not in use, and other accessories.

8. A measuring instrument permitting of measuring the superelevation of a rail and the gage of a railway track and also of verifying the inclination of the rails, comprising a level arranged in the longitudinal direction of the instrument and movable about a transverse axle in said instrument; a toothed sector moving with said level; a pointer movable in front of a graduated scale arranged on the upper face and in the longitudinal direction of the instrument; a rack upon which said pointer is mounted and movable in the longitudinal direction of the instrument; a vertical operating rod projecting above the instrument, carrying an operating knob and on which are rigidly mounted a worm gearing with the toothed sector of the level and a pinion gearing with the rack of the pointer; a fixed heel portion arranged at one of the ends of the instrument; a movable heel portion arranged at the other end of the instrument and urged outwardly toward the exterior by a returning spring; another pointer movable in front of a second graduated scale arranged on the upper face of the instrument opposite the preceding scale; a rack on which is mounted said pointer and movable in the longitudinal direction of the instrument; and means for transmitting with amplification the displacements of the movable heel portion to said rack.

9. A measuring instrument permitting of measuring the superelevation of a rail and the gage of a railway track and also of verifying the inclination of the rails, comprising a level arranged in the longitudinal direction of the instrument and movable about a transverse axis in said instrument,—means for displacing said level about said axis,—means for indicating and measuring the angular displacements imparted to this level,—a movable heel portion, arranged at one of the ends of the instrument and urged outwardly by a returning spring, means for indicating and measuring the linear displacements of said movable heel portion,—a branch constituting a false square, capable of rotating about an axis arranged at the end of the instrument opposite to the movable heel portion,—a stop adapted to hold said branch, when it is lowered, in such a position that its outer edge should make with the table of the instrument an angle equal to the inclination the rail must have.

10. A measuring instrument permitting of measuring the superelevation of a rail and the gage of a railway track and also of verifying the inclination of the rails, comprising a level arranged in the longitudinal direction of the instrument and movable about a transverse axis in said instrument,—means for displacing said level about said axis,—means for indicating and measuring the angular displacements imparted to this level,—a movable heel portion arranged at one of the ends of the instrument and urged outwardly by a returning spring,—means for indicating and measuring the linear displacements of said movable heel portion,—a branch constituting a false square capable of rotating about an axis arranged at the end of the instrument opposite to the movable heel portion,—a stud arranged on the instrument,—holes provided in the branch so that according to the hole into which the stud is engaged the branch occupies a position parallel to the instrument or such a position that it presents an outer inclined edge forming with the table of the instrument an angle equal to the inclination the rail must have.

11. A measuring instrument permitting of measuring the superelevation of a rail and the gage of a railway track and also of verifying the inclination of the rails, comprising a level arranged in the longitudinal direction of the instrument and movable about a transverse axis in said instrument,—means for displacing said level about said axis,—means for indicating and measuring the angular displacements imparted to this level,—a movable heel portion arranged at one of the ends of the instrument and urged outwardly by a returning spring,—means for indicating and measuring the linear displacements of said movable heel portion,—a branch constituting a false square capable of rotating about an axis arranged at the end of the instrument opposite to the movable heel portion and carrying at its end a hinged auxiliary branch capable of being placed in line with the first branch in case of the verification of the inclination of double headed rails and capable of being folded in case of the verification of the inclination of a flat bottom rail,—a stop adapted to hold the branch constituting a false square, when it is lowered, in such position that its outer edge forms with the table of the instrument an angle equal to the inclination the rail must have.

The foregoing specification of my instrument for measuring or verifying the superelevation, gage and inclination of the rails of railway tracks, signed by me this fourteenth day of March, 1913.

GEORGES LAKHOVSKY.

Witnesses:
  LUCIEN MESENINERGER,
  RENÉ THIRIOT.